(12) United States Patent
Tang et al.

(10) Patent No.: US 11,947,478 B2
(45) Date of Patent: Apr. 2, 2024

(54) METHODS FOR IDENTIFYING TARGET SLAVE ADDRESS FOR SERIAL COMMUNICATION INTERFACE

(71) Applicant: SCT LTD., Grand Cayman (KY)

(72) Inventors: Shang-Kuan Tang, Milpitas, CA (US); Eric Li, Milpitas, CA (US); Jim Wickenhiser, Milpitas, CA (US)

(73) Assignee: SCT LTD., Grand Cayman (KY)

( * ) Notice: Subject to any disclaimer, the term of this patent is extended or adjusted under 35 U.S.C. 154(b) by 115 days.

(21) Appl. No.: 17/652,413

(22) Filed: Feb. 24, 2022

(65) Prior Publication Data

US 2022/0188255 A1 Jun. 16, 2022

Related U.S. Application Data

(63) Continuation-in-part of application No. 17/644,011, filed on Dec. 13, 2021, now abandoned.

(60) Provisional application No. 63/124,494, filed on Dec. 11, 2020.

(51) Int. Cl.
| | | |
|---|---|---|
| G06F 13/00 | (2006.01) | |
| G06F 13/16 | (2006.01) | |
| G06F 13/362 | (2006.01) | |
| G06F 13/42 | (2006.01) | |

(52) U.S. Cl.
CPC ........ *G06F 13/362* (2013.01); *G06F 13/1668* (2013.01); *G06F 13/4247* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 2010/0122003 A1* | 5/2010 | Hu | ........................ | H04B 10/65 710/110 |
| 2016/0205066 A1* | 7/2016 | Attarwala | ........... | H04L 61/5038 709/208 |
| 2020/0264945 A1* | 8/2020 | Gangopadhyay | ..... | G06F 1/3296 |

* cited by examiner

*Primary Examiner* — Henry Tsai
*Assistant Examiner* — Dean Phan
(74) *Attorney, Agent, or Firm* — NKL Law; Allen Xue

(57) ABSTRACT

A method for programming and controlling of a plurality of slave devices serially connected in a daisy chain configuration using a master device includes assigning a unique slave address to each slave device in the plurality of slave devices by sending an initialization data packet from the master device serially through the plurality of slave devices; storing, in each of the plurality of slave devices, the assigned slave address; defining a data packet; and transmitting the data packet serially to one or more of the plurality of slave devices. The data packet has a target slave address, a read/write command, a start address, and optionally a register address and an increment value.

9 Claims, 14 Drawing Sheets

| Program All Slave Address | | | |
|---|---|---|---|
| Byte | Name | Value | Definition |
| #1 | Target Slave Address | {0x7F, 1'b0} | Broadcast address 0x7F, LSB:Write/Read 0:W, 1:R |
| #2 | Register | 0xFF | Register Address for Slave Address |
| #3 | Slave Address | #1 Slave Address | The 1st Slave Address in daisy chain |

FIG. 6

| Program All Slave Address | | | |
|---|---|---|---|
| Byte | Name | Value | Definition |
| #1 | Target Slave Address | {0x7F, 1'b0} | Broadcast address 0x7F, LSB:Write/Read 0:W; 1:R |
| #2 | Register | 0xFF | Register Address for Slave Address |
| #3 | Increment | Increment value | The increment value for Slave Address |
| #4 | Slave Address | #1 Slave Address | The 1st Slave Address in daisy chain |

FIG. 9

METHODS FOR IDENTIFYING TARGET SLAVE ADDRESS FOR SERIAL COMMUNICATION INTERFACE

RELATED APPLICATIONS

This application is a continuation-in-part of U.S. application Ser. No. 17/644,011, filed Dec. 13, 2021, which claims the benefit of priority under 35 U.S.C. § 119 to U.S. Provisional Application No. 63/124,494, filed on Dec. 11, 2020, the entire contents of which are incorporated herein by reference.

BACKGROUND

1. Field of Technology

This disclosure provides a method for programming and controlling the serial peripheral interface, or SPI, in particular, the method for programming and controlling the SPI in a daisy chain configuration.

2. Description of Related Art

SPI is one of the popular serial interfaces. SPI devices communicate in full duplex mode using a master-slave architecture usually with a single master. The master device ("master") originates the frame for reading and writing. Multiple slave devices ("slave") may be supported through selection with individual chip select (CS), sometimes called slave select (SS) lines. Some SPI Slave devices come with built-in address. In the independent SPI connection (e.g., FIG. 2), chip select (CS) is used to select one of the slave devices from all slave devices with the same built-in address. The master has one dedicated CS (i.e., CS1, CS2 and CS3) to each slave which has only one CS pin receiving the connection from the master. In the Daisy SPI connection (e.g., FIG. 3), the master has only one CS pin that parallel connects to all the CS pins in the slaves, the first slave output being connected to the second slave input, etc. Therefore, the daisy SPI connection reduces the number of CS wires. For the daisy chain connection, the data packet includes the information used to identify the target slave device, read/write operations (R/W), and data.

Conventionally, there are two ways to identify a target slave device in a daisy chain SPI connection: each slave has its own address pin, or, each slave has its internal fixed address and the address is unique. Packaging each slave with an address pin increases the size of the package while assigning each slave with an internal fixed and unique address also increases the cost of manufacturing slaves. The industry therefore adopted a two-field approach to communicate with serial peripheral interface that has no preassigned address in a daisy chain setup. That is, using two fields to locate a target slave. One field is the "Target Slave Address Field", and another field is the "Chain Field". When passing the two fields along the chain from the master to slaves, each slave that receives the two fields compare the values of the two fields to find a match. The slave will keep the data if the comparison yields a positivity. Otherwise, the slave will not keep the data, increments the chain field's value by "1" while keeping the Target Slave Address filed unchanged, and pass the two fields to the subsequent slave. Eventually, the data packet (which includes the two fields) reaches a slave that has the two fields' values being equal. This approach, although reliable, is cumbersome in terms of using large data bandwidth (i.e., two fields) to identify a slave and extra operation for each passing along the chain (i.e., incrementing the value of the chain field). Therefore, there is a need to reduce the operational cost associated with the two-field approach in communication within a daisy chain setup of a number of unaddressed interfaces.

SUMMARY

A method for programming and controlling of a plurality of slave devices serially connected in a daisy chain configuration using a master device is disclosed. The method includes: assigning a unique slave address to each slave device in the plurality of slave devices by sending an initialization data packet from the master device serially through the plurality of slave devices; storing, in each of the plurality of slave devices, the assigned slave address; defining a data packet, wherein the data packet defines a target slave address, a read/write command, and a start address; and transmitting the data packet to one or more of the plurality of slave devices.

According to some embodiments, the data packet further defines a register address. According to some embodiments, when the target slave address is not equal to a predefined broadcast address or the register address is not equal to the predefined location for slave address, performing a normal operation. According to some embodiments, during the normal operation, the plurality of slave devices receive the target slave address, and when the target slave address is equal to the predefined broadcast address, performing read/write operations to the plurality of slave devices. According to some embodiments, when the target slave address is equal to a slave address stored in a specific slave device, performing read/write operations on the specific slave device. According to some embodiments, when the target slave address is not equal to the slave address stored in a specific slave device, then transmitting the data packet to a subsequent slave device serially connected in the daisy chain; and comparing the target slave address with the slave address stored in the subsequent slave device. According to some embodiments, when the target slave address is equal to a predefined broadcast address and the register address is equal to a predefined location for slave address, performing a slave address programming operation. According to some embodiments, the data packet further defines an increment value. According to some embodiments, the increment value is one or an integer larger than one. According to some embodiments, the data packet further defines an incremented address having a value that equals to the start address plus the increment value. According to some embodiments, the method further includes: updating the incremented address in the subsequent slave device by adding the increment value to the incremented address.

BRIEF DESCRIPTION OF DRAWINGS

The teachings of the present invention can be readily understood by considering the following detailed description in conjunction with the accompanying drawings.

FIG. 6 describes bytes used in one way of programming all slave addresses.

FIG. 9 describes bytes used in another way of programming all slave address.

DETAILED DESCRIPTION

Figure 1:
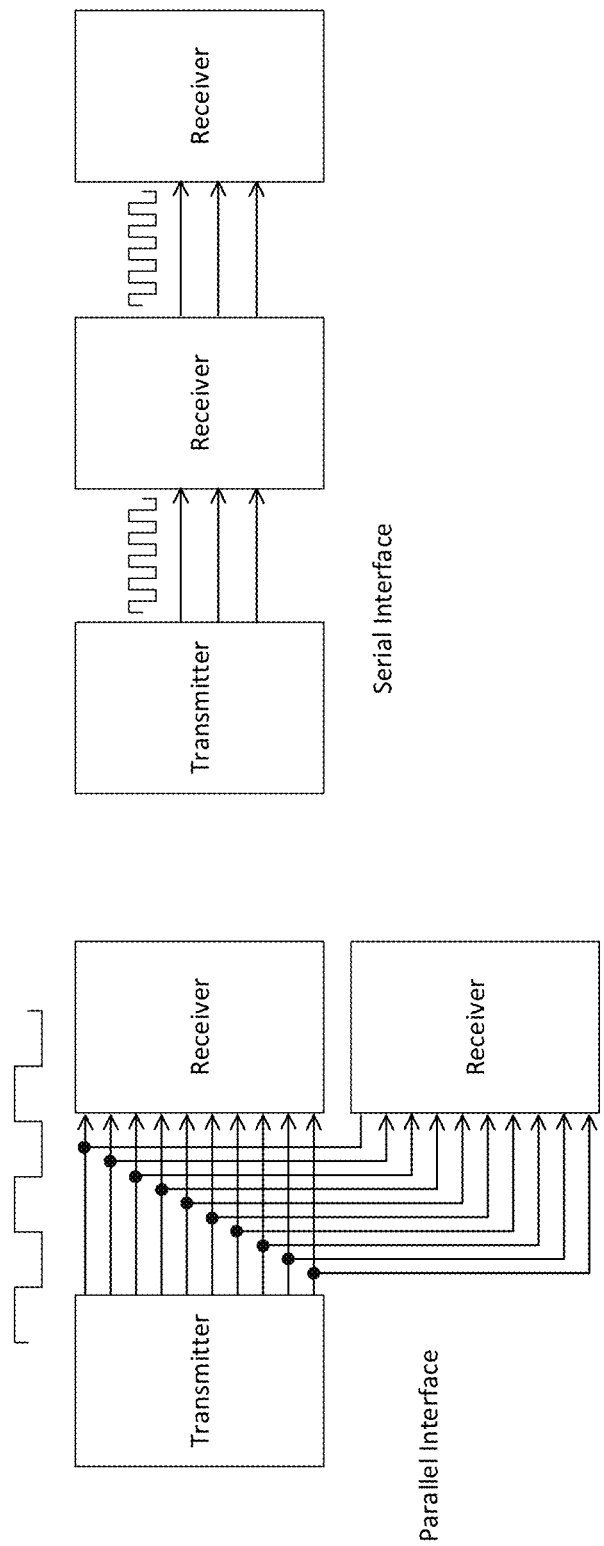
FIG. 1 schematically illustrates a parallel interface and a serial interface.

Serial communication is the process of sending data one bit at a time, sequentially, over a communication channel or computer bus. In contrast, parallel communication sends several bits as a whole on a link with several parallel channels. Serial communication reduces the number of wires between transmitter and receiver because all receivers are serially connected so an additional receiver can be connected to the last receiver in the existing series of receivers.

The Serial Peripheral Interface ("SPI") is a synchronous serial communication interface specification which is implemented for short-distance communication, for example, primarily in embedded systems. Typical applications of SPI include, for example, Secure Digital cards and liquid crystal displays.

SPI devices communicate in full duplex mode using a master-slave architecture usually implements a single master, some Atmel devices, however, can support changing roles on the fly depending on an external (SS) pin. The master device, or the controller, originates the frame for reading and writing. Multiple slave-devices may be supported through selection with individual chip select ("CS"), which are sometimes called slave select ("SS") lines.

SPI is also known as a four-wire serial bus, in comparison to three-, two-, and one-wire serial buses. The SPI may be described as a synchronous serial interface; it is, however, different from the Synchronous Serial Interface ("SSI") protocol, which is also a four-wire synchronous serial communication protocol. The SSI protocol implements differential signaling and provides only a single simplex communication channel. For any given transaction, SPI implements one-master and multi-slave communication. In this disclosure, "slave" and "slave device" are used interchangeably while "master" and "master device" are used interchangeably.

The SPI bus implements four logic signals: SCLK: Serial Clock (output from master); MOSI: Master Out Slave In (data output from master); MISO: Master In Slave Out (data output from slave); CS/SS: Chip/Slave Select (often active low, output from master to indicate that data is being sent). MOSI on a master connects to MOSI on a slave. MISO on a master connects to MISO on a slave. Slave Select has the same functionality as chip select and is implemented instead of an addressing concept. On a slave-only device, for example, MOSI may be labeled as SDI (Serial Data In) and MISO may be labeled, for example, as SDO (Serial Data Out).

The signal names above can be implemented to label both the master and the slave device pins as well as the signal lines between them. Pin names are always capitalized, for example, "Chip Select," not "chip select."

To begin communication, for example, the bus master configures the clock, using a frequency supported by the slave devices, which is typically up to a few MHz. The master then selects the slave device with a logic level 0 on the select line. If a waiting period is required, such as for an analog-to-digital conversion, the master wait for at least that period of time before issuing clock cycles.

During each SPI clock cycle, a full-duplex data transmission occurs. The master sends a bit on the MOSI line and the slave reads it, while the slave sends a bit on the MISO line and the master reads it. This sequence is maintained even when only one-directional data transfer is intended.

Transmissions usually involve two shift registers of certain given word-size, such as eight bits, one in the master and one in the slave; they are connected in a virtual ring topology. Data is usually shifted out with the most significant bit first. On the clock edge, both master and slave shift out a bit and output it on the transmission line to the counterpart. On the next clock edge, at each receiver the bit is sampled from the transmission line and set as a new least-significant bit of the shift register. After the register bits have been shifted out and in, the master and slave have exchanged register values. If more data needs to be exchanged, the shift registers are reloaded and the process is repeated. Transmission may continue for any number of clock cycles. When complete, the master stops toggling the clock signal, and typically deselects the slave.

Transmissions often carried out using eight-bit words. Other word-sizes are also common, however, for example, sixteen-bit words for touch-screen controllers or audio codecs, or twelve-bit words for many digital-to-analog or analog-to-digital converters. Multiple SPI devices may also be daisy-chained to conserve pins.

Every slave on the bus that has not been activated using its chip select line must disregard the input clock and MOSI signals and should not drive MISO, which means it must have a tristate output, although some devices need external tristate buffers to implement this.

Figure 2:
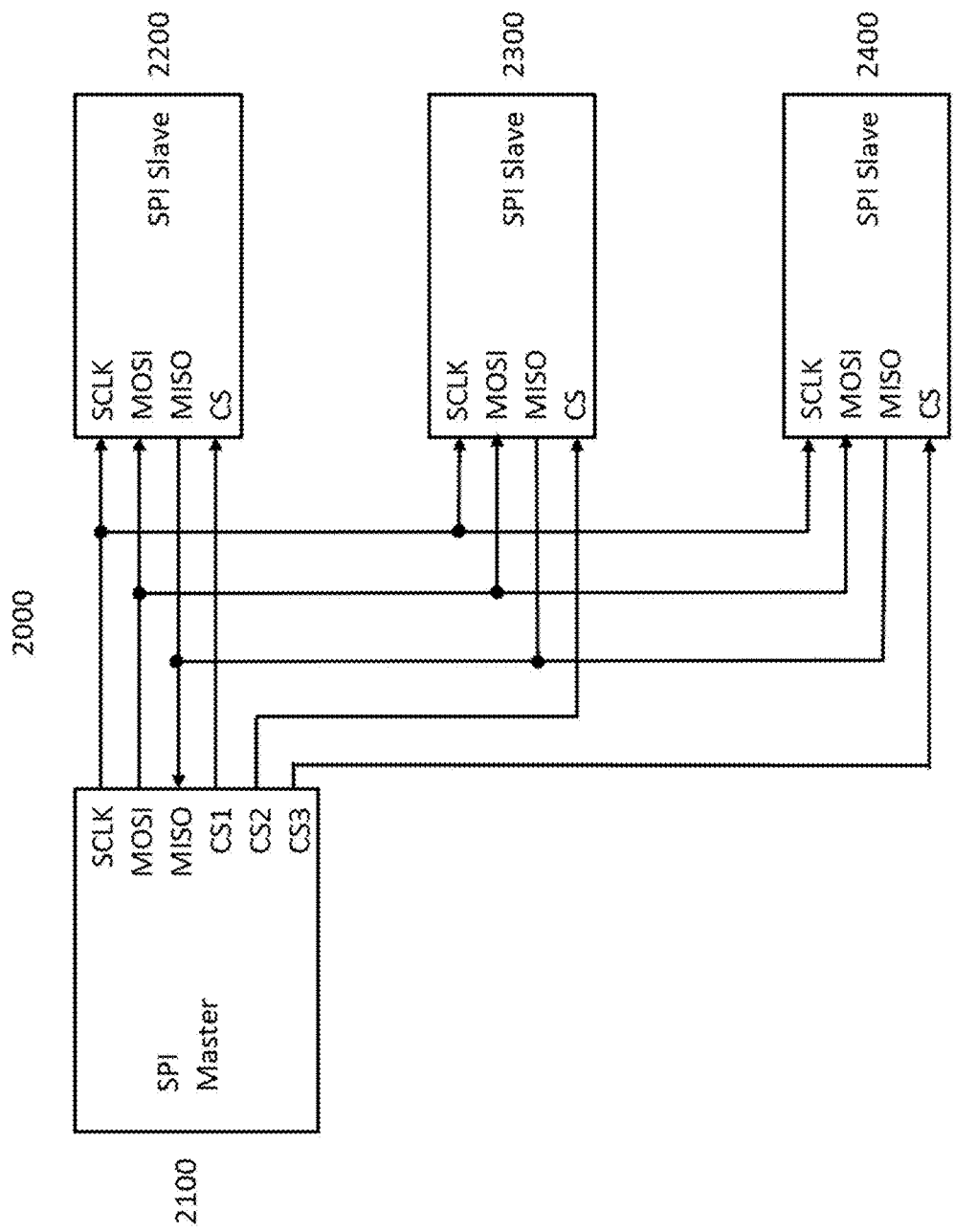
FIG. 2 schematically illustrates an SPI normal connection (i.e., parallel connection).

FIG. 1 schematically illustrates a parallel interface and a serial interface. FIG. 2 schematically illustrates an SPI normal connection configuration 2000 (i.e., parallel connection), which is a typical SPI bus configuration, or a SPI normal connection, with one master 2100, and three slaves 2200, 2300 and 2400. In the configuration 2000, the SCLK of the SPI master 2100 is connected simultaneously to the SCLK of the first SPI slave 2200, the SCLK of the second SPI slave 2300 and the SCLK of the third SPI slave 2400 in parallel; the MOSI of the SPI master 2100 is connected simultaneously to the MOSI of the first SPI slave 2200, the MOSI of the second SPI slave 2300 and the MOSI of the third SPI slave 2400 in parallel; the MISO of the first SPI slave 2200, the MISO of the second SPI slave 2300 and the MISO of the third SPI slave 2400 are simultaneously connected to the MISO of the SPI master 2100 in parallel. The CS1 of the SPI master 2100 is connected to the CS of the first SPI slave 2200, the CS2 of the SPI master 2100 is connected to the CS of the second SPI slave 2300 and the CS3 of the SPI master 2100 is connected to the CS of the third SPI slave 2400.

In the independent slave configuration, there is an independent chip select CS line for each slave, which is the way SPI is normally used. The master asserts only one chip select CS at a time.

Figure 3:
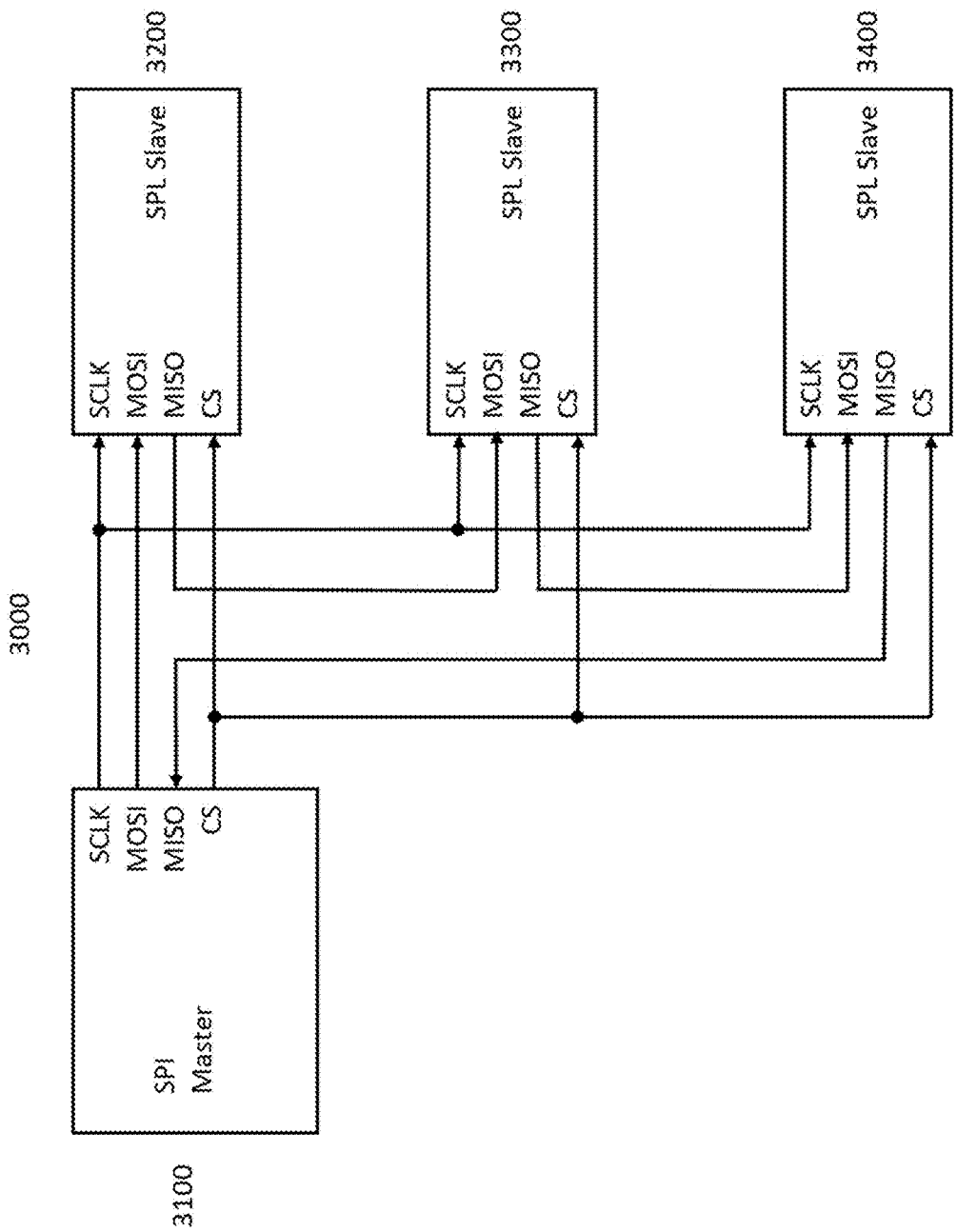
FIG. 3 schematically illustrates an SPI daisy chain connection (i.e., sequential connection).

FIG. 3 schematically illustrates an SPI daisy chain connection (i.e., sequential connection). The configuration 3000 is a daisy chain configuration having one master 3100 and three cooperative slaves 3200, 3300 and 3400. In the configuration 3000, the SCLK of the SPI master 3100 is connected simultaneously to the SCLK of the first SPI slave 3200, the SCLK of the second SPI slave 3300 and the SCLK of the third SPI slave 3400 in parallel. The MOSI and MISO of the master and three slaves are connected in a daisy chain configuration, for example, the MOSI of the SPI master 3100 is connected to the MOSI of the first SPI slave 3200, while the MISO of the first SPI slave 3200 is connected to the MOSI of the second SPI slave 3300, then the MISO of the second SPI slave 3300 is connected to the MOSI of the third SPI slave 3400, then the MISO of the third SPI slave is connected back to the MISO of the SPI master 3100, completing the daisy chain starting from the master through the three slaves and back to the master. The CS of the SPI master 3100 is simultaneously connected to the CS of the first SPI slave 3200, the CS of the second SPI slave 3300 and the CS of the third slave 3400.

The SPI port of each slave is configured to send out during the second group of clock-pulses an exact copy of the data it received during the first group of clock pulses. The whole chain acts as a communication shift register; daisy chaining is often implemented with shift registers to provide a bank of inputs or outputs through the SPI. Each slave copies input to output in the next clock cycle until active low CS line goes high. Such a feature only requires a single CS line from the master, rather than a separate CS line for each slave as illustrated in FIG. 2 above.

Figure 4:
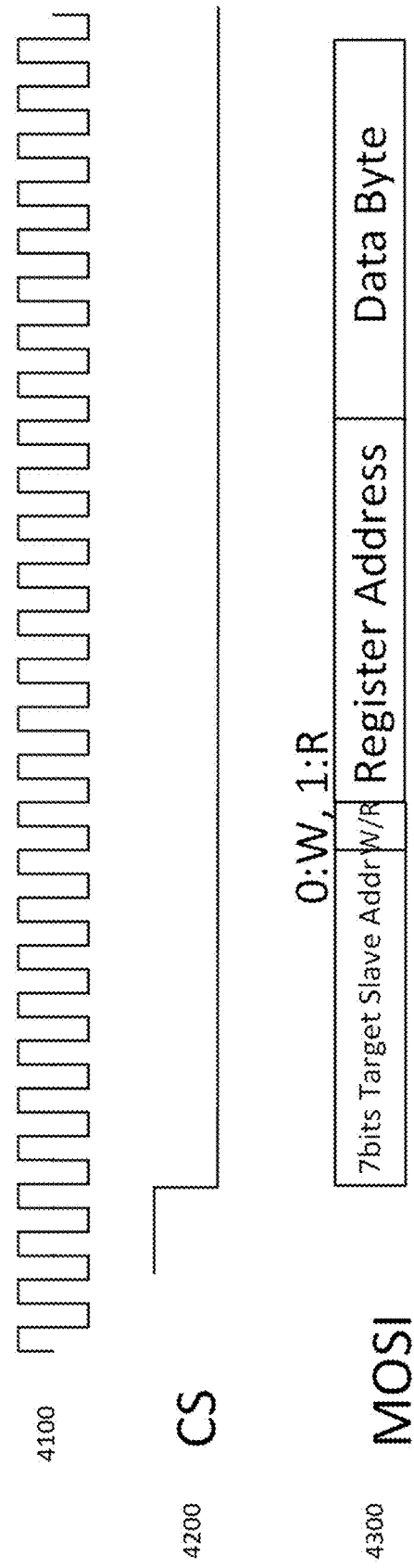
FIG. 4 schematically illustrates an example of a data package's composition in SPI daisy chain connection.

FIG. 4 schematically illustrates an example of a data package's composition in SPI daisy chain connection. In FIG. 4, 4100 is the clock, 4200 is CS, or chip select signal, and 4300 is an example of MOSI data structure, with the first 7 bits as the target slave address, the next bit as W/R, where 0 is write and 1 is read, with register address and data byte stored in the rest of the data.

Each Slave device has its own and unique address so that it can recognize whether the data it receives is intended for itself. One way to accomplish this is to require Slave devices to be equipped with address pins for hard wiring, which increases cost.

In the parallel configuration in FIG. 2, for example, the address of the first slave 2200 is address #1, the address of the second slave 2300 is address #2, the address of the third slave is address #3, and if the target slave address field in the MOSI 4300 is address #1, then the data in the MOSI 4300 will be received by the first slave 2200. Similarly, referring back to FIG. 4, if the target slave address field in the MOSI 4300 is address #2, then the data in the MOSI 4300 will be received by the second slave 2300, and if the target slave address field in the MOSI 4300 is address #3, then the data in the MOSI 4300 will be received by the third slave 2400. For example, if address #1 is 000, address #2 is 001, address #3 is 010, and if the target slave address in 4300 is 001, then the data in 4300 will be received by the second slave 2300. Similarly, if the target slave address is 010, the data in 4300 will be received by the third slave 2400.

Figure 5:
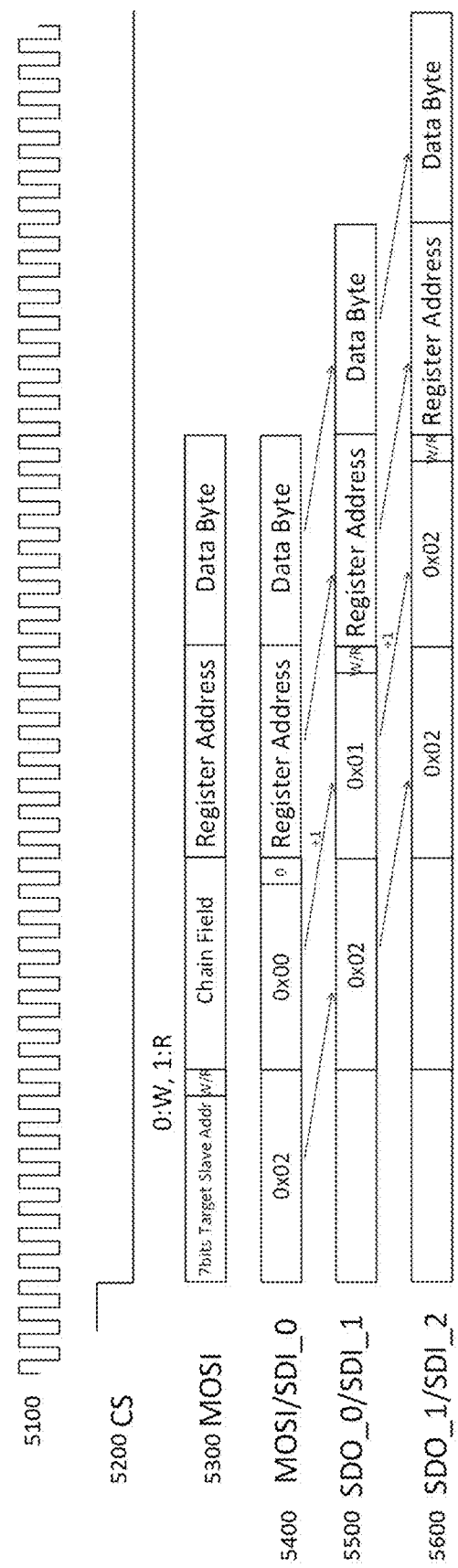
FIG. 5 schematically illustrates an example of how to locate a target in a chain of slaves in a SPI daisy chain connection in prior art.

FIG. 5 schematically illustrates an example of how to locate a target in a chain of slaves in a SPI daisy chain connection that is known. As shown in FIG. 5, the salve device is identified by adding one more field in the "data packet," hereby named "chain field." In one aspect, the "chain field" from Master will be set as "0x00". When the data packet pass through Slave device, the "chain field" will be increased by "1" and pushed to SDO.

The Slave device compares the "chain field" with the "Target Slave address field." If the addresses match, a target is located and the slave device is the target for the "data packet." Although this method can locate the target slave device, the additional "chain field" occupies additional bandwidth.

Referring again to FIG. 5, 5100 is the clock and 5200 is the CS. The MOSI 5300 implements an additional chain field after the 7-bit target slave address and one bit W/R. The chain field is followed by the register address and data byte. In the daisy chain configuration, when MOSI is transmitted to the first slave device, it is shifted to the right. For example, MOSI/SDI_0 5400 is shifted to the right to become SDO_0/ SDI_1 5500, and which is then shifted to become SDO_1/ SDI_2, as illustrated in FIG. 5. In this example, the 7-bit target slave address is 0x02, and the chain field is 0x00. During the shifting, the chain field is compared to the target slave address, once there is a match between the chain field and the target slave address, the target salve device is located, to which data is transmitted. As discussed above, the additional "chain field" occupies additional bandwidth and is a waste of resource.

The data in the daisy chain configuration in FIG. 3 is transmitted differently. For example, the target slave address in 5300 is address #3 and the chain field in 5300 is address #1, then the MOSI 5300 is transmitted to the first slave 3200 from the master 3100, following the daisy chain in FIG. 3, when the data MOSI/SDI_0 5400 transmitted from the first slave 3300, the chain field is incremented and becomes address #2, then a comparison is conducted between the target slave address and the chain field address. If there is a match, then the target slave is located. Otherwise, the data is transmitted to the next slave in the daisy chain until a match is found and the target slave is located. For example, SDO_0/SDI_1 5500 is transmitted to the next slave 3400, and the chain field is further incremented to become address #3 which matches the target slave address address #3, then the target slave is located and it is the third slave 3400. For example, the chain field is 000, the target slave address is 002, address #1 is 000, address #2 is 001 and address #3 is 002, then when SDO_0/SDI_1 comes out of the first slave, the chain field 000 is incremented by 1 to become 001, and SDO_0/SDI_1 is transmitted to the second slave 3300. When it comes out of the second slave 3300, the chain field 001 is incremented by 1 again to become 002. When it is transmitted to the third slave 3444, a comparison between the chain field and the target slave address field is conducted and a match is found, which means the data is meant for the third slave 3400. In the above implementation, the extra data field chain field is needed, which occupies additional storage and bandwidth. It is the goal of the present disclosure to avoid such an additional chain field to save storage and bandwidth.

FIG. 6 describes bytes used in one way of programming all slave addresses. In comparison, FIG. 9 describes bytes used in another way of programming all slave address, in which there is an additional byte (i.e., the 3$^{rd}$ byte) used to specify a customized increment value that is different from the default value of "1".

Figure 7:
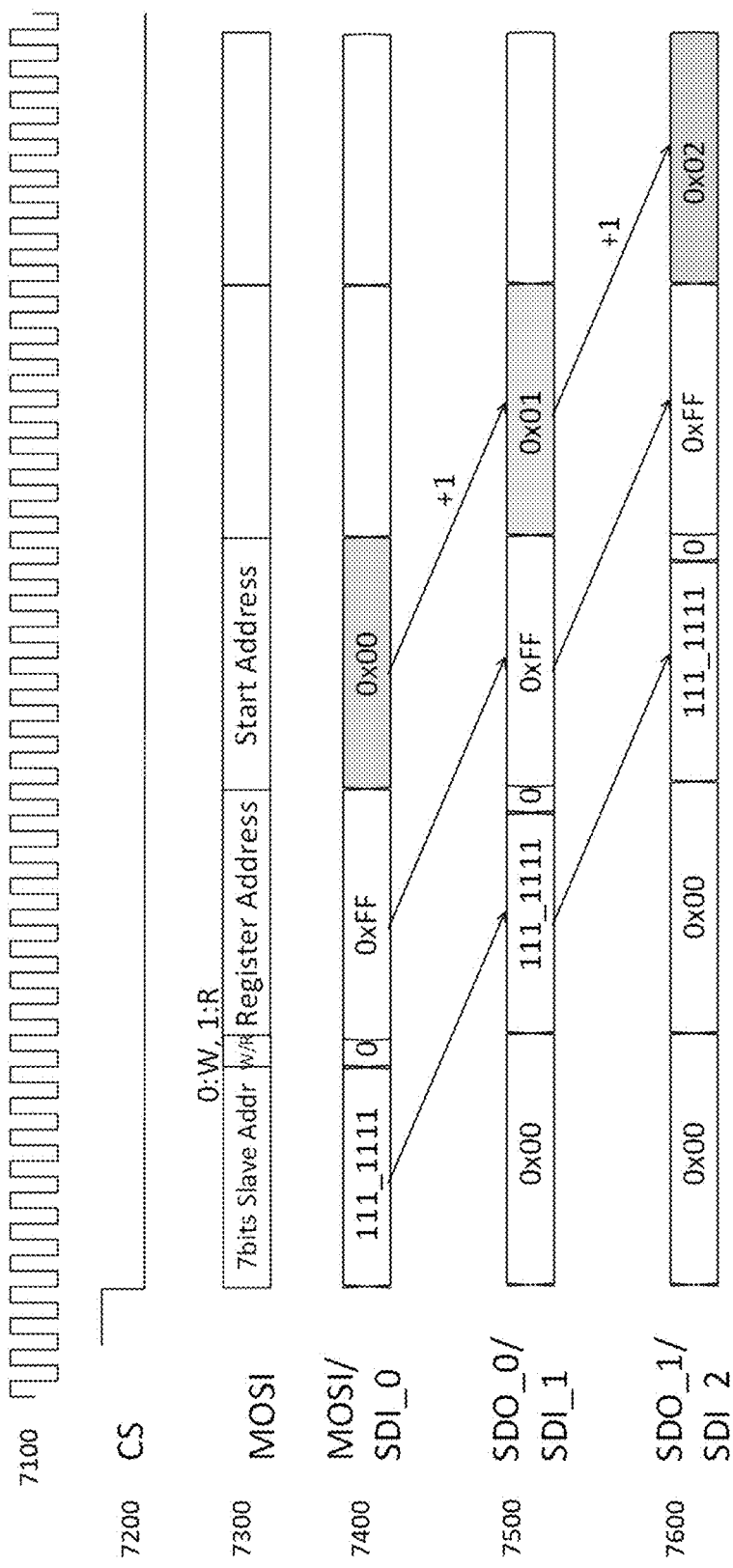
FIG. 7 schematically illustrates an example of how to program all slave addresses by assigning an address to each slave device by using the bytes described in FIG. 6.
Figure 8:
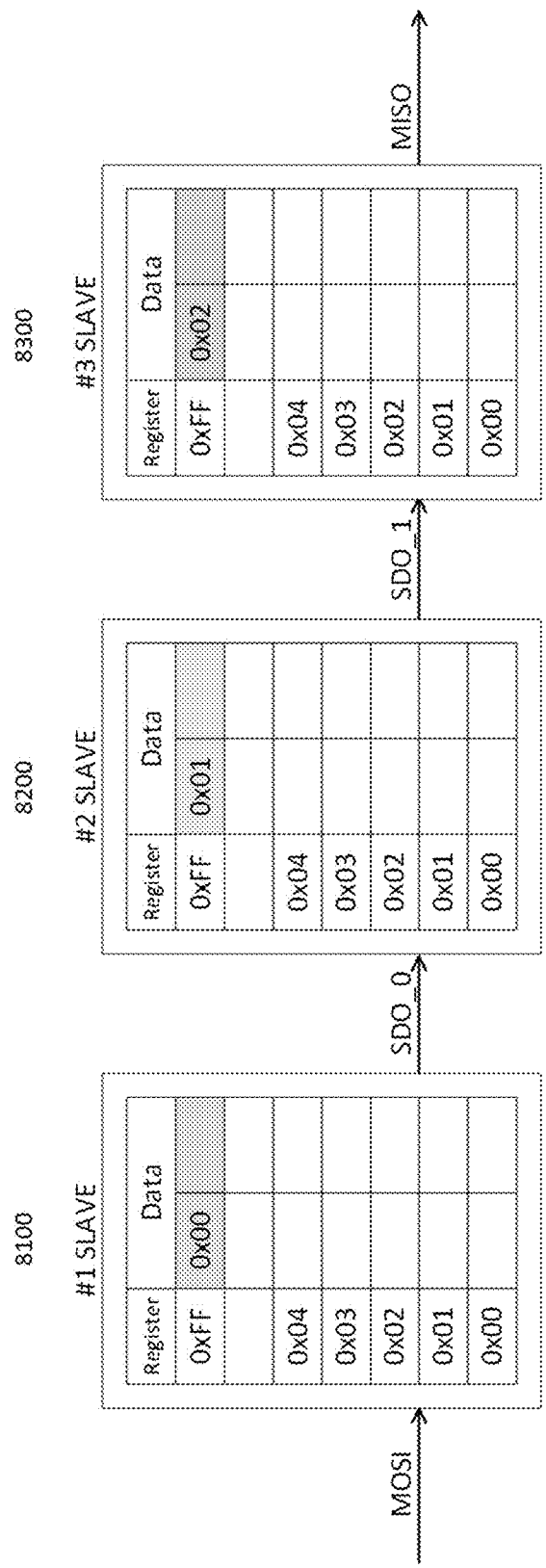
FIG. 8 schematically illustrates an example of the outcome of programming all slave addresses as illustrated in FIG. 7.

Correspondingly, FIG. 7 schematically illustrates an example of how to program all slave addresses, by assigning an address to each slave device by using the bytes described in FIG. 6; and FIG. 8 schematically illustrates an example of the outcome of programming all slave addresses as illustrated in in FIG. 7. Collectively, FIGS. 6-8 illustrate the first embodiment.

Figure 10:
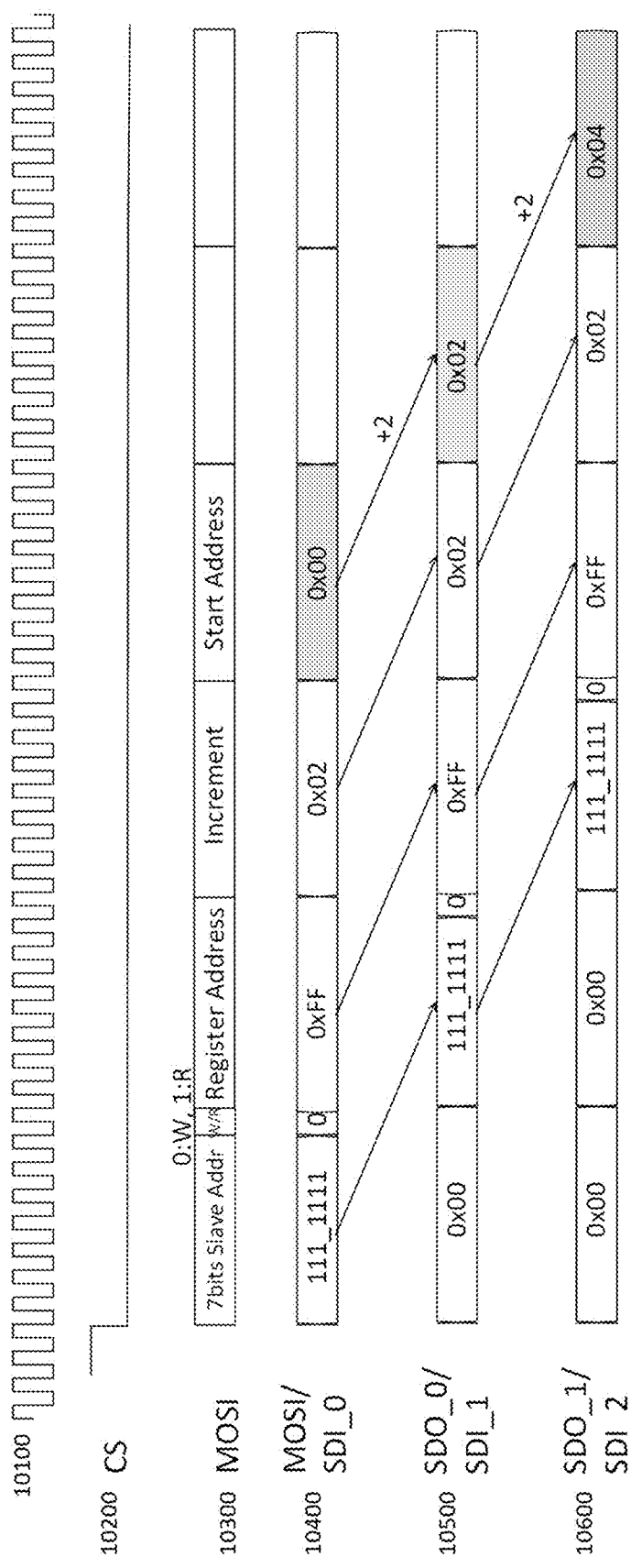
FIG. 10 schematically illustrates another example of how to program all slave address by assigning an address to each slave device by using the bytes described in FIG. 9.
Figure 11:
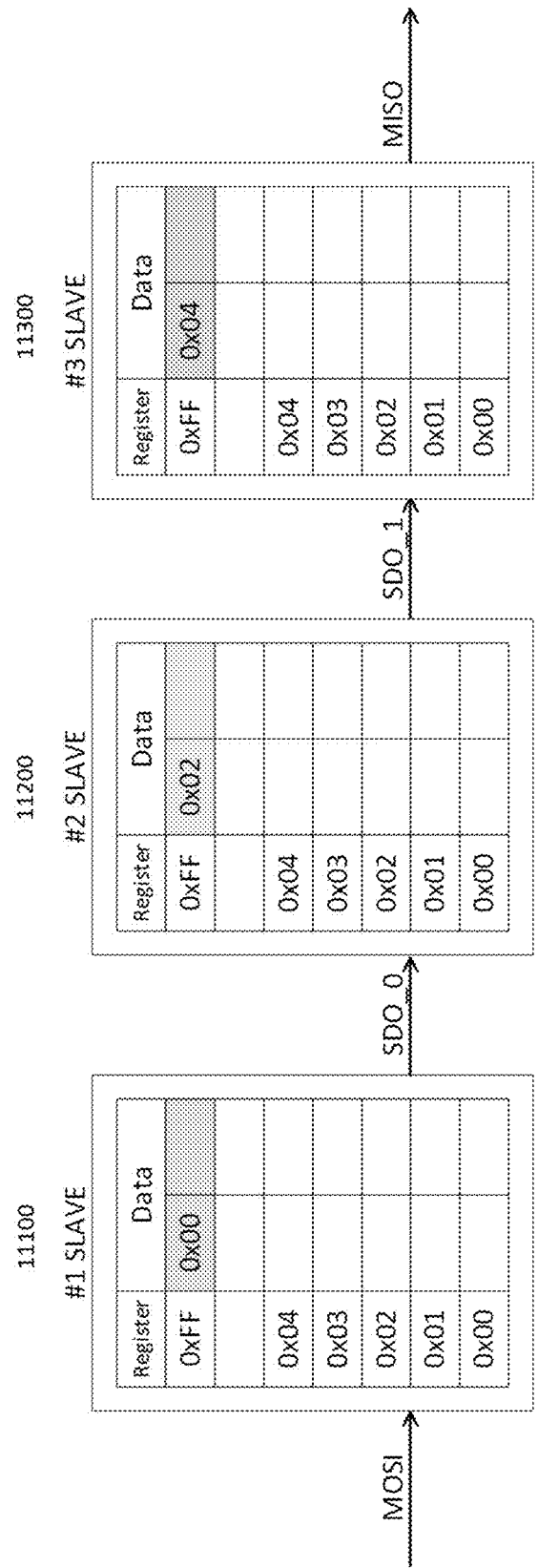
FIG. 11 schematically illustrated an example of the outcome of programming all slave addresses as illustrated in FIG. 10.
Figure 12:
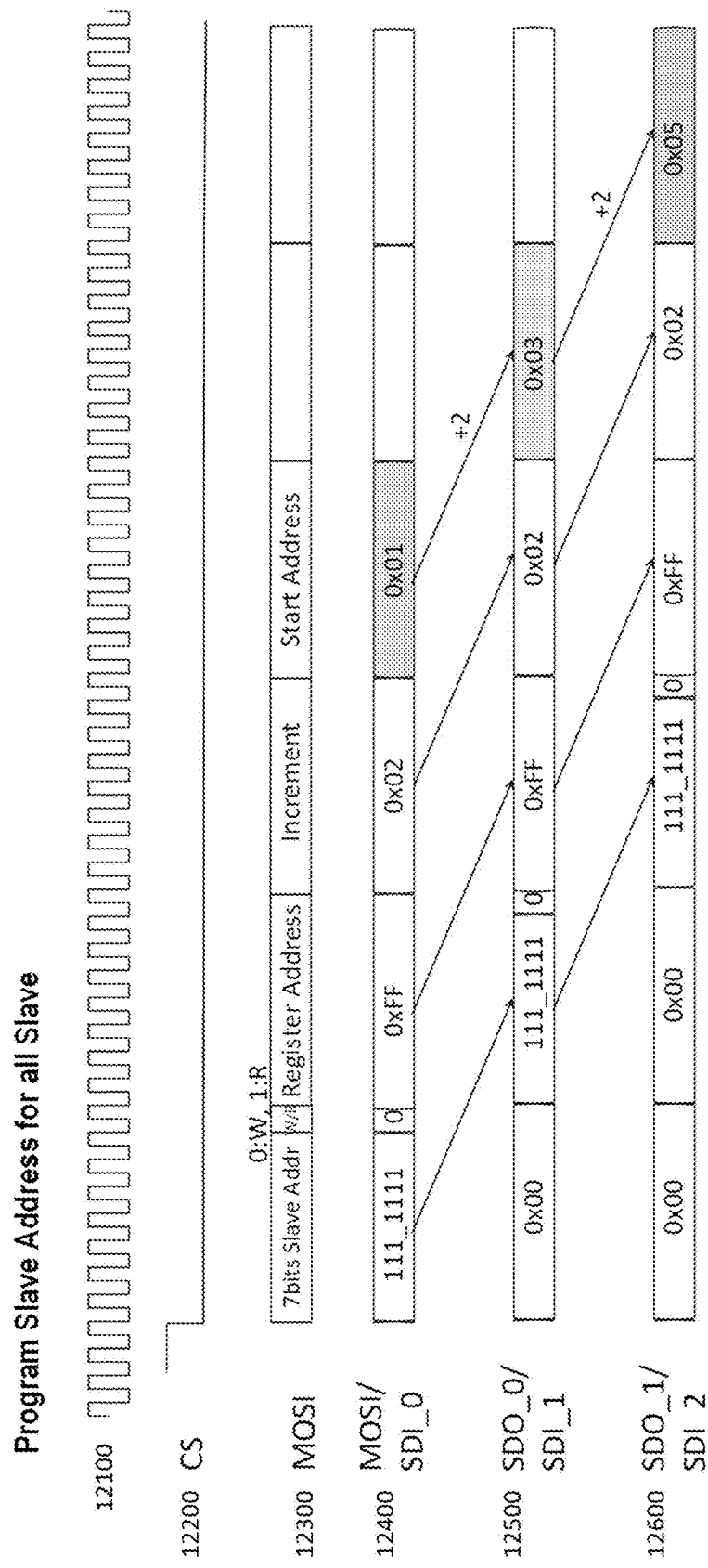
FIG. 12 schematically illustrated another example of how to program all slave address with using a different starting address (i.e., "0x01") and a customized increment value (i.e., "2").
Figure 13:
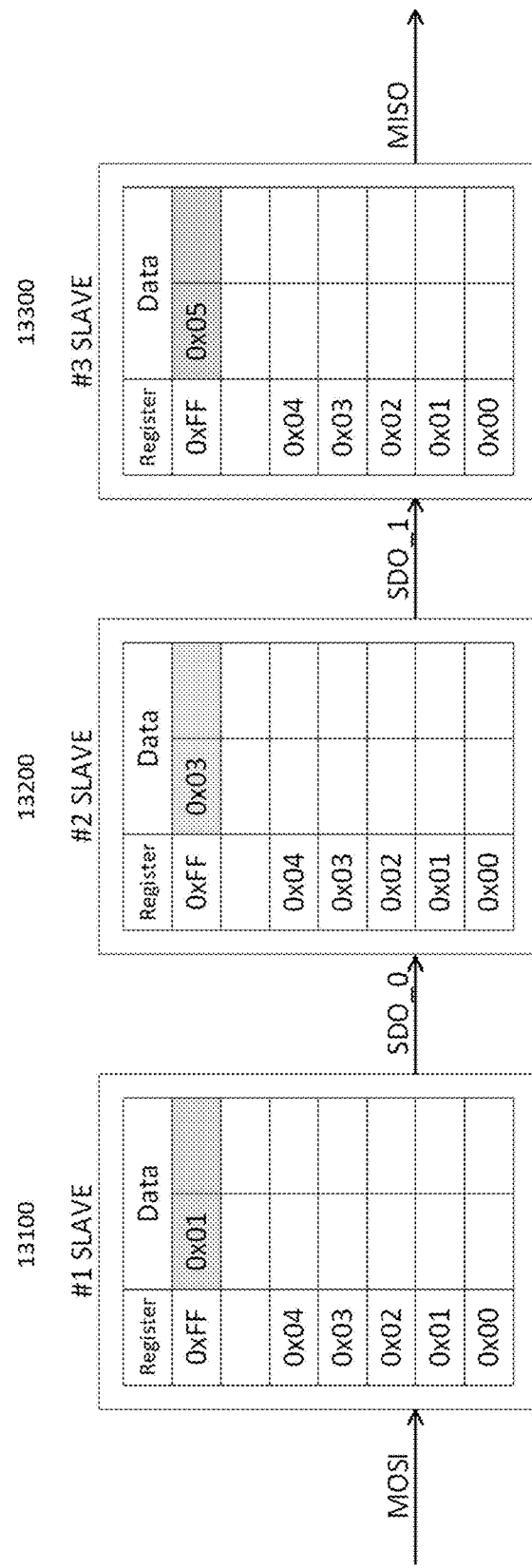
FIG. 13 schematically illustrated the result of the programming address as illustrated in FIG. 12

As for the bytes used in the other way of programming all slave address illustrated in FIG. 9, there are two embodiments, with FIGS. 10 and 11 corresponding to the second embodiment (together with FIG. 9), and FIGS. 12 and 13 corresponding to the third embodiment (together with FIG. 9). More specifically, FIG. 10 schematically illustrates another example of how to program all slave address by assigning an address to each slave device by using the bytes described in FIG. 9, and FIG. 11 schematically illustrated an example of the outcome of programming all slave addresses as illustrated in FIG. 10. In comparison, FIG. 12 schematically illustrated another example of how to program all slave address with using a different starting address (i.e., "0x01") and a customized increment value (i.e., "2") described in FIG. 9, and FIG. 13 schematically illustrated the result of the programming address as illustrated in FIG. 12.

FIGS. 6-8 illustrate a first embodiment of the methods in this disclosure, in which all slave devices can be assigned its own unique address, and the master can control the slave devices as if the slaves were hard wired at their respective address pins.

FIG. 6 describes bytes used in one way of programming all slave addresses. According to the table in FIG. 6, 0x7F in the "Target Slave Address" field (byte #1) defines a command that is broadcasted to all the slave devices in the daisy chain. The "Register" field (byte #2) defines the specific location where the Slave Address for this slave device is stored. The "Slave Address" field (byte #3) is filled with the first Slave address in daisy chain.

FIG. 7 schematically illustrates an example of how to program all slave addresses, by assigning an address to each slave device by using the bytes described in FIG. 6. In FIG. 7, 7100 is the clock signal, chip select CS is 7200, and MOSI 7300 includes the first 7-bit as Slave Address, the next bit W/R, followed by register Address and Start Address. For example, 7400 MOSI/SDI_0 includes the first 7-bit Slave Address 111_111, followed by the next bit 0 which is W, followed by register address 0xFF and then start address 0x00 for slave #1 8100. In the daisy chain configuration, MOSI/SDI_0 is transmitted to the next slave and thus shifted to the right to become SDO_0/SDI_1. The default increment is 1, the start address 0x00 is incremented by 1 to become 0x01 in slave #2 8200. SDO_0/SDI_1 is further shifted to the right to become SDO_1/SDI_2, the start address 0x01 is incremented by 1 to become 0x02 in slave #3 8300. FIG. 8 illustrates the same process in a different way, in which SPI Chain starts at 0x00 and has an increment of 0x01.

In order to avoid using the chain field, a "programing address", or "address programming", operation is conducted on all slave devices to initialize, or program, the salve device. This "programming address" only needs to be done once upon power on. For example, an address is stored in the "register address" field of 7300 upon initialization when the salve devices are powered on. For example, at the address 0xFF of the first slave device 3200, address #1 is stored, at the address 0xFF of the second slave device 3300, address #2 is stored, at the address 0xFF of the third slave device 3400, address #3 is stored, the starting address. The slave addresses address #1, address #2 and address #3 are programmed and stored in the slave addresses in the corresponding slave devices.

When conducting programming address operation, address #1 is stored at the 0xFF address in the first slave 3200, then address #1 is incremented to become address #2 to be transmitted to the next slave 3300, then address #2 is stored at the address 0Xff of the second slave 3300. Then again address #2 is incremented to become address #3 to be transmitted to the third slave 3400, and address #3 is stored at 0xFF of the third slave 3400. For example, address #1 is 000, 000 is stored at 0xFF of the first slave 3200, then 000 is incremented by 1 to become 001 and is transmitted to the second slave 3300, and 001 is stored at 0xFF of the second slave 3300. Then 001 is further incremented by 1 to become 002 to be transmitted to the third slave 3400, and 002 is stored at 0xFF of the third slave 3400. As such, the chain field is no longer needed in the daisy chain configuration in subsequent transmissions, only the target field is needed, thus saving storage and bandwidth.

FIG. 8 schematically illustrates an example of the outcome of programming all slave addresses as illustrated in in FIG. 7, in which SPI Daisy Chain starts with the address of "0x00" and carries a default increments the address value by the default increment value of "1" for each passing, yielding three addresses of "0x00000000", "0x00000001", and "0x00000010" for the three slaves along the chain, respectively.

As shown in FIGS. 7 and 8, when the slave device receives the data packet and recognizes the data packet is for programming the slave address, it stores the "slave address" (byte #3) into register at the location defined in Register field (Byte #2). In the meantime, the slave address (byte #3) will be increased by "1" and pushed to SDO. In normal operations, after all slave devices have been programmed and assigned their corresponding slave addresses (i.e., address #1, address #2 and address #3), the first field in the data packet is "target slave address", which conducts the read and write operation for the corresponding slave device. The LSB (least significant bit) of the target slave address field defines the read/write operation. The slave device which receives the "target slave address" compares the received target slave address with the stored slave device address to check whether there is a match. If there is a match, the read/write operation is executed. When the "target slave address" matches, however, the predefined broadcast address, the read/write operation is executed in all the slave devices.

FIG. 9 describes bytes used in another way of programming all slave address, in which there is an additional byte (i.e., the 3$^{rd}$ byte) used to specify a customized increment value that is different from the default value of "1". FIGS. 9-11 illustrate the second embodiment in the methods of disclosure. FIGS. 9, 12-13 illustrate the third embodiment in the methods of disclosure. Compared with the first embodiment, the second and third embodiments employ one more field—the "Increment" field (byte #3), which defines the increment of the Slave Address. The "Increment" field and "Slave Address" enable the system to assign multiple Slave chains having different addresses.

According to FIGS. 10-11, in first chain (SPI Chain 1), the increment is 0x02 and initial slave address is 0x00. According to FIGS. 12-13, In the second chain (SPI Chain 2), the increment is 0x02 and the initial Slave address is 0x01. Therefore, the Slave addresses in SPI Chain 1 are 0x00, 0x02, 0x04, . . . , etc., while the Slave addresses in SPI Chain 2 become 0x01, 0x03, 0x05, . . . , etc. The increment can be adjusted to accommodate more than two SPI chains.

FIG. 10 schematically illustrates another example of how to program all slave address by assigning an address to each slave device by using the bytes described in FIG. 9. FIG. 10 illustrates an example of how to program all slave addresses for all slaves. Signal 10100 is the clock, chip select CS is 10200, and MOSI 10300 includes the first 7-bit as Slave Address, the next bit W/R, followed by register Address and Start Address. For example, 10400 MOSI/SDI_0 includes the first 7-bit Slave Address 111_1111, followed by the next bit 0 which is W, followed by register address 0xFF and then start address 0x02 for slave #1 11100. In the daisy chain configuration, MOSI/SDI_0 is transmitted to the next slave and thus shifted to the right to become SDO_0/SDI_1, as illustrated in FIG. 10, the increment is 2, the start address 0x00 is incremented by 2 to become 0x02 in slave #2 11200. SDO_0/SDI_1 is further shifted to the right to become SDO_1/SDI_2, the start address 0x02 is incremented by 2 to become 0x04 in slave #3 11300.

In the address programming operation, the first field is a "predefined broadcast address", and the LSB defines a "write" operation. Another field defines the location (for example, 0xFF) in the storage for storing the "slave address" (for example, address #1). The location can be the address of a register, or the address in the memory in the salve device. This field becomes optional when the "location" is predefined. The "increment" is defined in another field for the slave address, and again, if the increment is predefined, this "increment" is optional. Another field defines "start address" for MOSI which is the master output and the slave input. Another field defines the "increment address" for the output of the slave devices.

In the address programming operation, if the slave device confirms that the packet is for programming slave address operation, the first slave device stores the "slave address" in the "location" (for example, 0xFF) in the first slave device. And the "start address" is incremented by the "increment value" to become the incremented address, which is transmitted to the second slave device. The same operation is conducted when the packet is transmitted from the second slave device to the third slave device, and so on.

In the address programming operation, once the slave device (other than the first slave device) confirms that the packet is for programming slave address purpose, the slave device stores the "incremented address" in the "location" and add the "increment value" to the "incremented address" to obtain the updated "incremented address".

FIG. 11 schematically illustrated an example of the outcome of programming all slave addresses as illustrated in FIG. 10, in which SPI Daisy Chain starts with the address of "0x00" and increments the address value by the customized increment value of "2" for each passing, yielding three addresses of "0x00000000", "0x000000010", and "0x00000100" data transmission in SPI Chain 1, respectively, which starts at 0x00 and has an increment of 0x02. FIG. 11 illustrates an example in which SPI Chain 1 starts at 0x01 and has an increment of 0x02. The register values of slave #1 11100, slave #2 11200 and slave #3 11300 are illustrated corresponding to the illustration in FIG. 10. Collectively, FIGS. 9-11 illustrate the second embodiment.

FIG. 12 schematically illustrated another example of how to program all slave address with using a different starting address (i.e., "0x01") and a customized increment value (i.e., "2"). Referring to FIG. 12, the start address can be 0x01 instead of 0x00 shown in FIG. 10. The start address of 12400 is 0x01 in MOSI/SDI_0, which is shifted to the right and incremented by 2 to become 0x03 in 12500 SDO_0/SDI_1, which is further shifted to the right and incremented by 2 to become 0x05 in 12600 SDO_1/SDI_2.

FIG. 13 schematically illustrated the result of the programming address as illustrated in FIG. 12. FIG. 13 illustrates an example in which SPI Chain 2 starts at 0x01 and has an increment of 0x02. The register values of slave #1 13100, slave #2 13200 and slave #3 13300 are illustrated corresponding to the illustration in FIG. 12. FIGS. 12 and 13 illustrate examples of programming address for slaves in SPI Chain 2 using a different starting address, which starts at 0x01 and has an increment of 0x02. Collectively, FIGS. 9, 12-13 illustrate the third embodiment.

Figure 14:
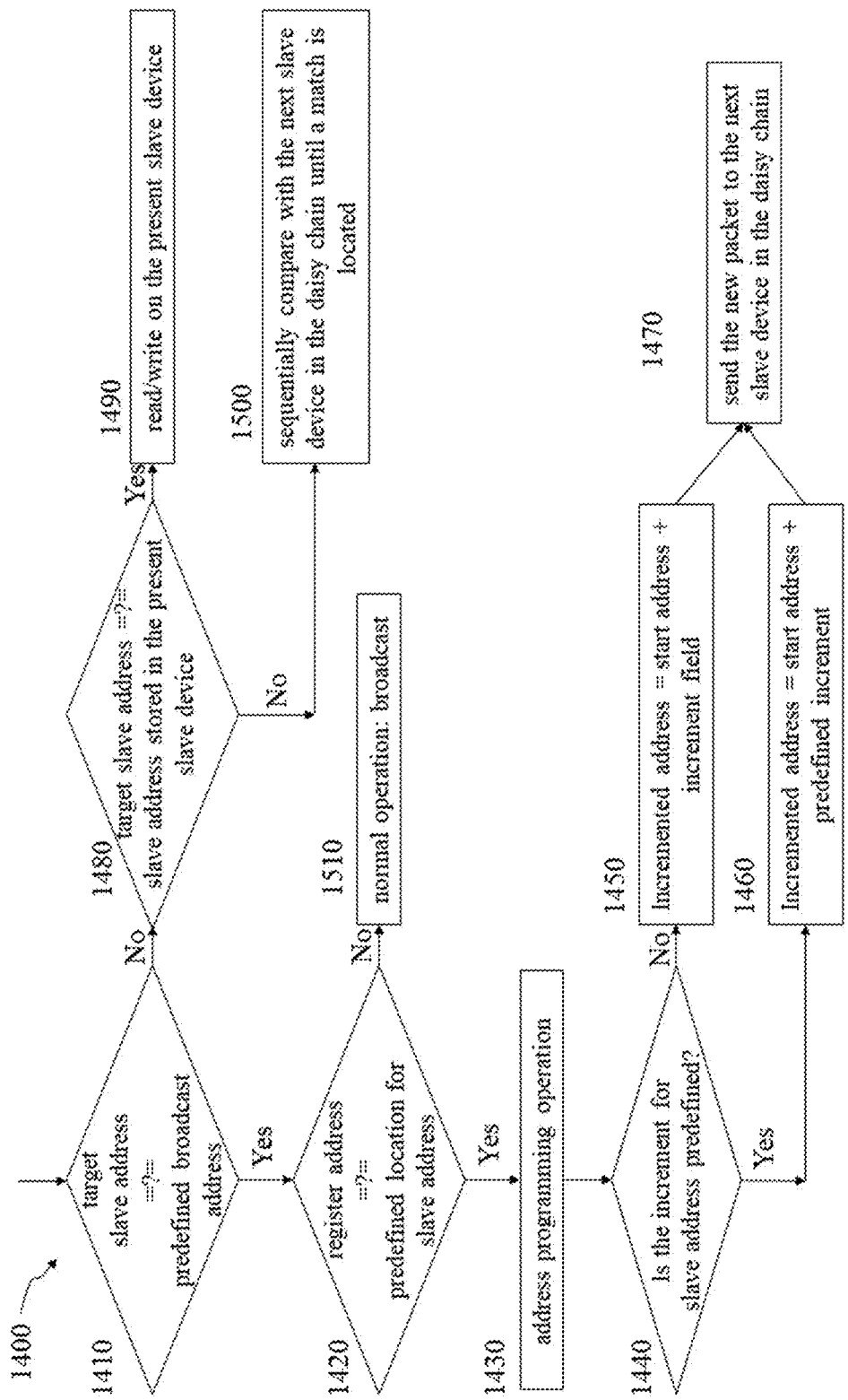
FIG. 14 is a flowchart illustrating a method for read/write in serial peripheral interface daisy chain connection.

FIG. 14 is a flowchart 1400, which illustrates methods for communicating amongst devices arranged in serial peripheral interface daisy chain. According to some embodiments, in the first step 1410, a target slave address is compared with a predefined broadcast address, which can be, for example, 0x7F. If the target slave address is equal to the predefined broadcast address, the next step is 1420. Otherwise, the target slave address is not equal to the predefined broadcast address and the next step is 1480. In the step 1420, a register address is compared with a predefined location for slave address. If the register address matches the predefined location for slave address, then the next step is 1430, which performs the address programming operation. When the register address does not match the predefined location for slave address, then the next step is 1510, which performs one of the normal operations, namely, sending the same data packet to all slave devices, i.e., broadcasting. When the address programming operation is performed in step 1430, a determination is made in the step 1440: whether the increment for slave address is predefined, or stored in the data packet. If the increment for slave address is not predefined, then the next step is 1450, and the increment for slave address is defined in the "increment" field in the data packet, and the incremented address can be calculated as: incremented address=start address+increment field. If the increment for slave address is predefined, e.g., having a default value of 1, then the next step is 1460, and the incremented address can be calculated as: incremented address=start address+predefined increment. For example, when the predefined increment is the default value of 1, then the incremented address can be calculated as: incremented address=start address+1. When the incremented address is obtained either from step 1450, or 1460, the new data packet is sent to the next slave device in the daisy chain.

In the step 1480, the target slave address is compared with a slave address stored in the present slave device. If the target slave address equals the slave address stored in the present slave device, then a match with the present slave device is found and the read/write operation is performed on the present slave device. As discussed earlier, when the corresponding r/w bit is 0, write is performed on the present slave device, and when the corresponding r/w bit is 1, read is performed on the present slave device. When the target slave address does not match the slave address stored in the present slave device, then in the next step 1500, the target slave address is sequentially compared with the slave address stored in the next slave device in the daisy chain until a match is located.

Variations of the above embodiments are numerous. The scope of protection is not limited to the embodiments described herein. The scope of protection is only limited by the claims. The scope of the claims shall include all equivalents of the subject matter of the claims.

We claim:

1. A method for programming and controlling of a plurality of slave devices serially connected in a daisy chain using a master device, the method comprising:

assigning a unique slave address to each slave device in the plurality of slave devices by sending an initialization data packet from the master device serially through the plurality of slave devices;

storing, in each of the plurality of slave devices, a slave address;

defining a data packet, wherein the data packet defines a target slave address, a read/write command, and a start address; and transmitting the data packet to one or more of the plurality of slave devices, wherein the data packet further defines a register address, and when the target slave address is not equal to a predefined broadcast address or the register address is not equal to a predefined location for slave address, performing a normal operation.

2. The method of claim 1, wherein, during the normal operation, the plurality of slave devices receive the target slave address, and when the target slave address is equal to the predefined broadcast address, performing read/write operations to the plurality of slave devices.

3. The method of claim 1, when the target slave address is equal to the slave address stored in one of the plurality of slave devices, performing read/write operations to said one of the plurality of slave devices.

4. The method of claim 1, when the target slave address is not equal to the slave address stored in a specific slave device, then transmitting the data packet to a subsequent slave device serially connected in the daisy chain; and comparing the target slave address with the slave address stored in the subsequent slave device.

5. A method for programming and controlling of a plurality of slave devices serially connected in a daisy chain using a master device, the method comprising:

assigning a unique slave address to each slave device in the plurality of slave devices by sending an initialization data packet from the master device serially through the plurality of slave devices;

storing, in each of the plurality of slave devices, a slave address;

defining a data packet, wherein the data packet defines a target slave address, a read/write command, and a start address;

transmitting the data packet to one or more of the plurality of slave devices, wherein the data packet further defines a register address, and when the target slave address is equal to a predefined broadcast address and the register address is equal to a predefined location for slave address, performing a slave address programming operation.

6. The method of claim 5, wherein the data packet further defines an increment value.

7. The method of claim 6, wherein the increment value is one or an integer larger than one.

8. The method of claim 6, wherein the data packet further defines an incremented address having a value that equals to the start address plus the increment value.

9. The method of claim 8, further comprising: updating the incremented address in a subsequent slave device serially connected in the daisy chain by adding the increment value to the incremented address.

* * * * *